May 25, 1954 F. M. LUNN 2,679,310
LATERAL TRANSFER MEANS
Filed April 15, 1952 3 Sheets-Sheet 1

Inventor
Frank May Lunn

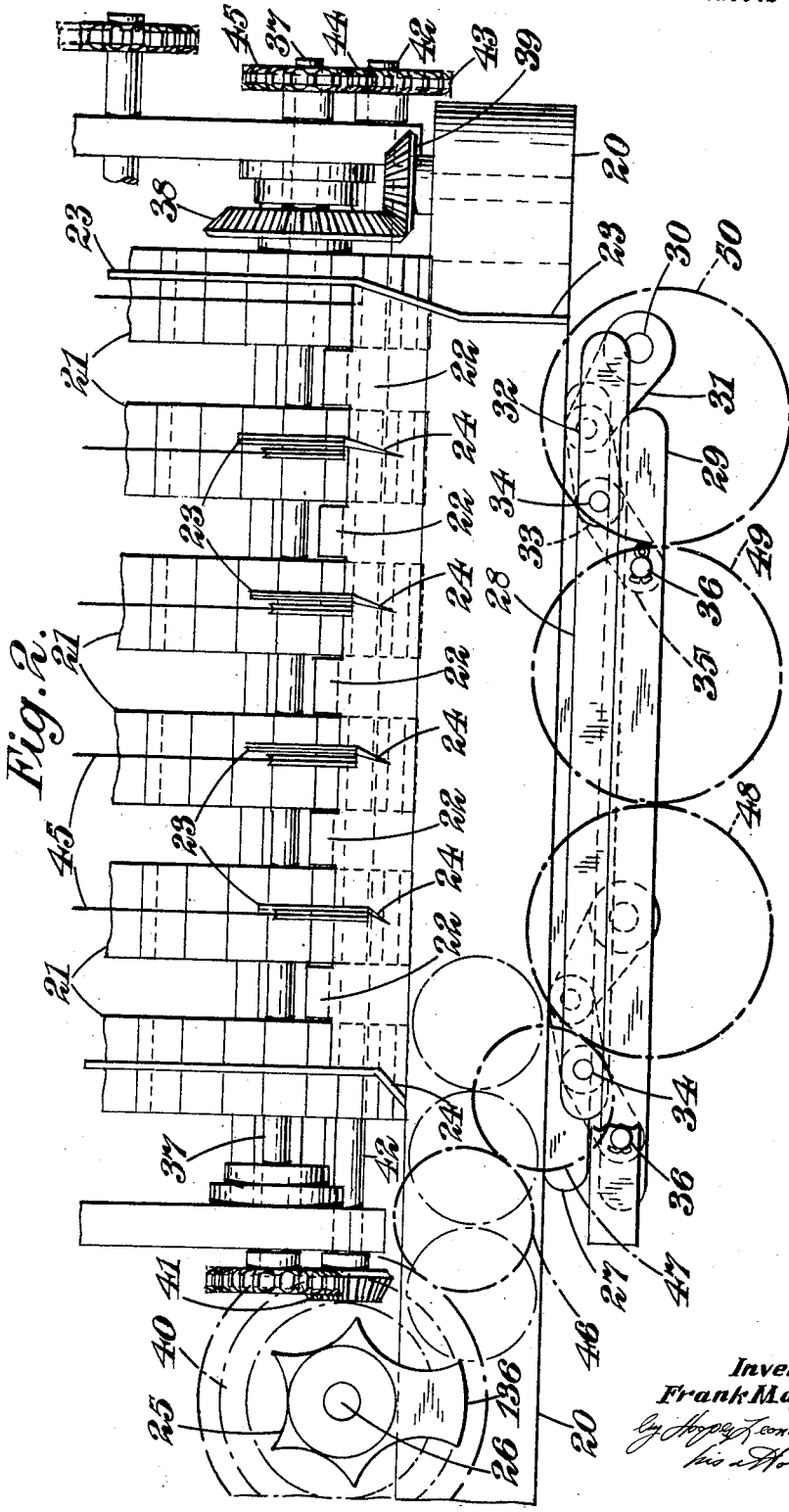

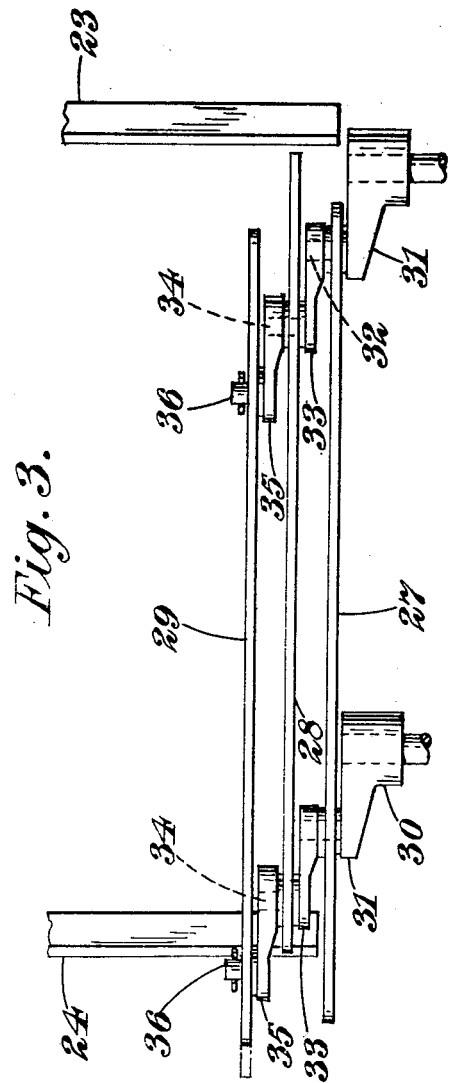

Patented May 25, 1954

2,679,310

UNITED STATES PATENT OFFICE 2,679,310

LATERAL TRANSFER MEANS

Frank May Lunn, Osterley, Isleworth, England, assignor to United Dairies (London) Limited, London, England, a British company Application April 15, 1952, Serial No. 282,401

9 Claims. (Cl. 198—31)

This invention relates to mechanism for transferring successive articles or batches of articles laterally from a moving conveyor and is particularly concerned with the marshalling of milk bottles in the required numbers and dispositions for loading into crates. It is already known to transfer articles laterally from a moving conveyor by means of a reciprocable pusher bar. It will be appreciated that the pusher bar must be moved comparatively rapidly in order to remove the articles from the moving conveyor, and the articles are thus liable to considerable impact by the bar and may suffer considerable damage.

In the case where the mechanism is used for transferring bottles from a conveyor extending between a bottle washing machine and a bottle crating machine the bottles will be arranged in single file along the conveyor and, in the latest type of bottle washing apparatus which washes bottles at a rate of about 200 bottles a minute, the conveyor must collect them at this rate thus the transfer mechanism must also operate at a considerable speed.

An object of the present invention is to provide a transfer mechanism which will enable the articles to be transferred laterally at a comparatively high speed from the conveyor without excessive impact upon the article and without holding up the oncoming articles for any appreciable time.

According to this invention a mechanism for transferring successive articles or batches of articles laterally from a moving conveyor comprises two spaced parallel crank shafts each having a number of crank pins at different distances from its crank shaft axis and angularly displaced from one another, a number of parallel pusher bars mounted on and extending between the pivot pins on the two crank shafts and means for rotating these shafts.

In one construction according to this invention the transfer mechanism comprises a number of substantially horizontal pusher bars arranged at different heights, the lower pusher bar being provided at its opposite ends with bearings which engage crank pins of two spaced crank shafts disposed beneath the pusher bar and which crank pins are fixed to crank arms disposed above the first said pusher bar and having pins extending through bearings in the next higher pusher bar and which two pins in their turn are fixed to other cranks above the latter pusher bar and are provided with two other pins which pass through bearings in the next higher pusher bar and so on according to the number of pusher bars employed, the lowermost crank shafts being rotated and which sets of crank arms are so angularly disposed in relation to one another and are of such a length that the bars consecutively engage an article or batch of articles at increasing speed. Stop means may be arranged to extend across the conveyor so as to arrest the article or batch of articles during the time when they are being laterally displaced.

In the case of a mechanism for transferring bottles from a conveyor which is moving at the rate of about two hundred bottles per minute three pusher bars may be provided disposed one above the other and the distance of the lowermost crank pins from the crank shaft axis may be about two inches and the crank shafts are rotated at a rate of about forty revolutions per minute. The length of each of the next cranks between the two crank pins is about one and five-eighth inches and one and a half respectively and the length of the upper cranks is about one and a half inches. The distances of the respective crank pins from the crank shaft axis are about two inches, three inches and about four and three-quarters inches respectively.

Means are provided for periodically arresting the line of oncoming articles for sufficient time to enable the pusher bars to move forwards and backwards across the conveyor. For example the arresting means may comprise a starwheel mounted to one side of the conveyor to rotate about an upright axis and having one of its arms so shaped that during a portion of the rotation forces itself between two adjacent articles and arrests the oncoming line.

The following is a description of one form of the invention as applied to a bottle crating machine reference being made to the accompanying drawings in which:

Figure 2 is a plan view of one end of the apparatus; and

Figure 3 is an end elevation of the arrangement shown in Figure 2.

Figure 1:
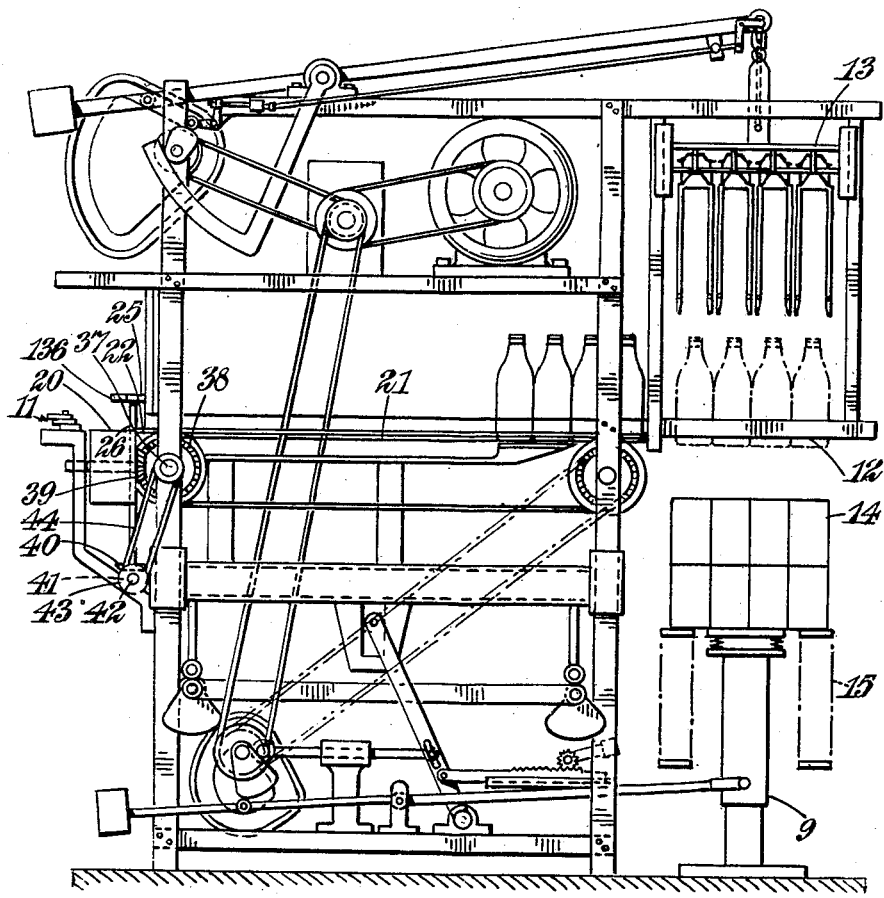
Figure 1 is a side elevation of the apparatus.

In brief, the apparatus comprises an endless belt conveyor 20 for bringing to the machine the bottles to be crated, a transfer mechanism 11 at a receiving station as described below whereby the bottles are transferred to a marshalling mechanism which is a subject of the invention described in application Serial No. 282,402, filed April 15, 1952, and which marshalling mechanism brings the groups of bottles to a loading station 12 where the bottles are received by a gripping head 13 as described in the application Serial No. 282,403, filed April 15, 1952, which gripping head lowers them and deposits them into a crate 14 which has been brought into position opposite them by means of a conveyor 15 and an elevating mechanism 9 whereafter the gripping head is raised and the marshalling mechanism recommences in its cycle of movement.

Referring now to Figures 2 and 3 the bottles to be transferred to the marshalling apparatus are brought opposite the transferring device and marshalling device by an endless belt conveyor 20. The marshalling device comprises a number of endless bands 21 spaced apart and extending transversely to the endless belt conveyor 20 the upper stretch of conveyor is arranged in the same plane as the upper stretch of each endless band 21. The shaft 37 supporting pulleys for endless bands 21 has fixed to it a bevel gear 38 which engages a bevel pinion on a shaft 39 to which is fixed one of two pulleys supporting the endless band 20. A plate 22 is arranged to bridge the gap between the conveyor and marshalling device. Guide plates 23 are disposed centrally over the receiving ends of the upper stretches of the endless bands 21 of the marshalling devices and the extremities of these guide plates adjacent the conveyor 20 are provided with inclined portions 24 the last guide plate 23 in respect of the travel of the bottles extends completely across the endless belt conveyor 20 and constitutes a stop for locating a group of bottles opposite the marshalling device.

There is also disposed to one side of the endless conveyor a starwheel 25 which is rotated by an upright shaft 26 and having one of its arms 136 so shaped as to force itself between two of the bottles and during a part of the rotation to arrest the oncoming bottles on the conveyor after the required number have been brought opposite the marshalling device, in the present instance after five have been so located. The starwheel shaft 26 has fixed to it a bevel gear 40 which meshes with a bevel pinion 41 on one end of a cross shaft 42 the other end of which is provided with a sprocket 43. The sprocket is driven by a chain 44 encircling a sprocket 45 on the shaft 37.

The transfer mechanism comprises three pusher bars 27, 28 and 29 disposed parallel to one another and to the aforesaid conveyor 20 and are driven by two upright crank shafts 30 mounted on the opposite side of the conveyor 20 to the marshalling device. The crank shafts are driven by a train of gear wheels 46, 47, 48, 49 and 50 from a pinion 51 on the shaft 26. Each crank shaft 30 is provided with a crank arm 31 to which is fixed a crank pin 32 which passes through a bearing at the end of the pusher bar 27 and is fixed to another crank arm 33. The crank arm 33 is provided with a crank pin 34 which extends through a bearing in the pusher bar 28 and is fixed to a crank arm 35. The crank arm 35 is provided with a crank pin 36 which extends through a bearing in the uppermost pusher bar 29. The distance of each crank pin 32 from a crank shaft axis is about two inches and the length of each of the crank arms 33, 35 between the crank pins thereon is about one and five-eighth and one and a half inches respectively. The distances of the crank pins 32, 34 and 36 from the crank shaft axis are two inches, three inches and about four and three-quarters inches respectively. The axis of rotation of the crank shaft 30 is disposed at about one and a half inches from the edge of the conveyor belt.

Driving means are provided for rotating the shaft about forty revolutions per minute. The rate of traverse of the conveyor 20 is about sixty-three feet per minute. With the above arrangement the pusher bars 27, 28, 29 successively engage a group of five bottles so that the bottles are moved with increasing velocity thereby avoiding shock. The direction of rotation of the crank shafts is such that the pusher bars are moving in the same direction as the conveyor when in contact with the bottles.

Assuming the crankshafts shown in Figure 2 are rotating clockwise, the pusher bar 27 is the first to come into contact with a line of bottles. Since the radial distance of the crank pins 32 from the crankshaft is comparatively small, the component of movement of the pusher bar 27 across the endless belt 20 will be correspondingly small. As the rotation proceeds the next pusher bar 28 will come into contact with the line of bottles before the first pusher bar starts receding and since the radial distance of the crank pins 33 from the crankshaft is greater than the radial distance of the crank pins 32 the component of movement of the pusher bar 28 will reach a higher value than that of the pusher bar 27. As the rotation of the crank shaft proceeds further, the pusher bar 29 will come into contact with the line of bottles, which by this time will be approaching the far edge of the belt 20, and since the radial distance of the crank pins 34 from the crankshafts is still greater, the movement of the bottles across the belt will be further accelerated and the bottles will pass into the marshaller. A fresh line of bottles will then be assembled by the belt 20 and the pusher bars will again reach the position shown in Figure 2.

I claim:

1. A mechanism for transferring successive articles or batches of articles laterally from a moving conveyor comprising two spaced parallel crank shafts each having a number of crank pins at different distances from its crank shaft axis and angularly displaced from one another, a number of parallel pusher bars mounted on and extending between the pivot pins on the two crank shafts and means for rotating these shafts.

2. A transferring mechanism according to claim 1 and comprising a number of substantially horizontal pusher bars arranged at different heights, the lower pusher bar being provided at its opposite ends with bearings which engage crank pins of two spaced crank shafts disposed beneath the pusher bar and which crank pins are fixed to crank arms disposed above the first said pusher bar and having pins extending through bearings in the next higher pusher bar and which two pins in their turn are fixed to other cranks above the latter pusher bar and are provided with two other pins which pass through bearings in the next higher pusher bar and so on according to the number of pusher bars employed, the lowermost crank shafts being rotated and which sets of crank arms are so angularly disposed in relation to one another and are of such a length that the bars consecutively engage an article or batch of articles at increasing speeds, and when in engagement are moving in the same direction as the conveyor.

3. A transferring mechanism according to claim 1, wherein stop means are arranged to extend across the conveyor so as to arrest the article or batch of articles during the time when they are being laterally displaced.

4. A mechanism according to claim 1 for transferring bottles from a conveyor which is moving at a rate of about 200 bottles per minute and comprising three pusher bars disposed one above the other and wherein the distance of the lowermost crank pins from their crank shaft axes is about two inches and the distances between the crank-pin axes on each intermediate crank is one and five-eighth inches, and the distances between the crank-pins on each upper crank is one and a half inches, while the distances of the various crank-pins from the axis of the crank shaft are two inches, three inches and four and three-quarter inches respectively.

5. A transferring mechanism according to claim 1 wherein means are provided for periodically arresting a line of oncoming articles for sufficient time to enable the pusher bars to move forward and backwards across the conveyor.

6. Transferring mechanism according to claim 1 wherein means are provided for arresting a line of oncoming articles comprising a starwheel mounted to one side of the conveyor to rotate about an upright axis and which during a portion of each revolution has a part which forces itself between two adjacent articles and arrests the oncoming line.

7. A transfer mechanism according to claim 1 in combination with a marshalling device comprising a number of endless belts extending transversely to said conveyor which belts are spaced apart and the marginal portions of each pair being arranged to support a number of the articles which have been displayed laterally from the conveyor by the pusher bars.

8. A transfer mechanism according to claim 1 in combination with a marshalling device, comprising a number of endless belts extending transversely to said conveyor belts which belts are spaced apart and each is provided with an upright guide plate extending along the center thereof and projecting towards the edge of the aforesaid conveyor so that the marginal portions of adjacent belts are arranged to support a number of the articles which have been displaced laterally from the conveyor by the pusher bars.

9. A transfer mechanism according to claim 1 in combination with a marshalling device, comprising a number of endless belts extending transversely to said conveyor and spaced apart, an upright guide plate extending along the center of each of the belts and projecting towards the edge of the aforesaid conveyor, which projecting ends of the plates are inclined and are provided with knife edges, so as to assist in the gathering up of the articles, which are arranged to be supported by adjacent marginal portions of a pair of belts after the articles have been displaced laterally from the conveyor by the pusher bars.

References Cited in the file of this patent

UNITED STATES PATENTS

| Number | Name | Date |
|---|---|---|
| 2,464,530 | Reimers | Mar. 15, 1949 |